(12) United States Patent
Dubrova et al.

(10) Patent No.: US 10,313,125 B2
(45) Date of Patent: Jun. 4, 2019

(54) GENERATING CRYPTOGRAPHIC CHECKSUMS

(71) Applicant: Telefonaktiebolaget LM Ericsson (publ), Stockholm (SE)

(72) Inventors: Elena Dubrova, Sollentuna (SE); Fredrik Lindqvist, Järfälla (SE); Mats Näslund, Bromma (SE); Göran Selander, Bromma (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 207 days.

(21) Appl. No.: 15/319,465

(22) PCT Filed: Jun. 27, 2014

(86) PCT No.: PCT/EP2014/063632
§ 371 (c)(1),
(2) Date: Dec. 16, 2016

(87) PCT Pub. No.: WO2015/197128
PCT Pub. Date: Dec. 30, 2015

(65) Prior Publication Data
US 2017/0141918 A1     May 18, 2017

(51) Int. Cl.
*H04L 29/06* (2006.01)
*H04L 1/00* (2006.01)
(Continued)

(52) U.S. Cl.
CPC .......... *H04L 9/3093* (2013.01); *H04L 1/0061* (2013.01); *H04L 9/0643* (2013.01);
(Continued)

(58) Field of Classification Search
CPC ....... H04L 9/3093; H04L 9/0643; H04L 9/14; H04L 9/3242; H04L 1/0061; H04L 63/06; H04W 12/04
(Continued)

(56) References Cited

U.S. PATENT DOCUMENTS

| 5,220,606 A | 6/1993 | Greenberg |
| 5,345,507 A * | 9/1994 | Herzberg .................. H04L 9/32 380/28 |

(Continued)

FOREIGN PATENT DOCUMENTS

| JP | 2003-503743 A | 1/2003 |
| JP | 2008-532410 A | 8/2008 |

(Continued)

OTHER PUBLICATIONS

Notice of Reasons for Rejection dated Mar. 20, 2018 issued in Japanese Patent Application No. 2016-575485 (with partial translation). (11 pages).

(Continued)

Primary Examiner — Michael S McNally
(74) Attorney, Agent, or Firm — Rothwell, Figg, Ernst & Manbeck, p.c.

(57) ABSTRACT

A method (500) of generating a cryptographic checksum for a message M(x) is provided. The method comprises pseudo-randomly selecting (502) a generator polynomial p(x) from the set of polynomials of degree n over a Galois Field and calculating (504) the cryptographic checksum as a first function g of a division of a second function of M(x), $f(M(x))$, modulo p(x), $g(f(M(x)) \mod p(x))$. The generator polynomial p(x) is pseudo-randomly selected based on a first cryptographic key. By replacing a standard checksum, such as a Cyclic Redundancy Check (CRC), with a cryptographic checksum, an efficient message authentication is provided.

(Continued)

The proposed cryptographic checksum may be used for providing integrity assurance on the message, i.e., for detecting random and intentional message changes, with a known level of security. Further, a corresponding computer program, a corresponding computer program product, and a checksum generator for generating a cryptographic checksum, are provided.

23 Claims, 5 Drawing Sheets

(51) Int. Cl.
    *H04L 9/06*          (2006.01)
    *H04L 9/14*          (2006.01)
    *H04L 9/30*          (2006.01)
    *H04L 9/32*          (2006.01)
    *H04W 12/04*       (2009.01)

(52) U.S. Cl.
    CPC .............. *H04L 9/14* (2013.01); *H04L 9/3242* (2013.01); *H04L 63/06* (2013.01); *H04W 12/04* (2013.01); *H04L 2209/34* (2013.01); *H04L 2209/80* (2013.01)

(58) Field of Classification Search
    USPC ........................................................ 380/247
    See application file for complete search history.

(56) References Cited

U.S. PATENT DOCUMENTS 5,978,959 A     11/1999    Hekstra et al.
2012/0191888 A1   7/2012     Schachtner et al.

FOREIGN PATENT DOCUMENTS

WO       01/01628 A1     1/2001
WO    2006/092753 A1    9/2006
WO    2006/116801 A1   11/2006

OTHER PUBLICATIONS

Elena Dubrova et al., A BDD-Based Approach to Constructing LFSRs for Parallel CRC Encoding, 2012 42nd IEEE International Symposium on Multiple-Valued Logic (ISMVL), (2012). (7 pages).
Elena Dubrova et al., Lightweight CRC-based Message Authentication, Cryptology ePrint Archive: Report 2015/1138, Version 2015/126:193950. (19 pages).
Krawczyk, H., et al., "LFSR-based Hashing and Authentication", Advances in Cryptology (Crypto), Santa Barbara, Aug. 21-25, 1994, [Proceedings of the Annual International Cryptology Conference (Crypto)], Berlin, Springer, DE, Aug. 21, 1994, pp. 129-139, XP019194289.
"IEEE Standard for Local and metropolitan area networks Part 15.4: Low-Rate Wireless Personal Area Networks (LR-WPANs)", Internet citation, Sep. 5, 2011, pp. I-XVIII, XP002728593.
International Search Report and Written Opinion dated Mar. 23, 2015 in International application No. PCT/EP2014/063632, 10 pages.
Birch, J., et al., "A programmable 800 Mbit/s CRC check/Generator unit for LANs and MANs", Computer Networks and ISDN Systems 24 (1992) pp. 109-118.
Gao, S., et al., "Tests and Constructions of Irreducible Polynomials over Finite Fields", Foundations of Computational Mathematics, Springer 1997, pp. 346-361.

\* cited by examiner

| n | m | $\varepsilon_1$ | $\varepsilon_2$ | $\varepsilon_0$ |
|---|---|---|---|---|
| 32 | 20 | $1/2^{20.85}$ | $1/2^{21.50}$ | $1/2^{25.30}$ |
| 32 | 40 | $1/2^{16.82}$ | $1/2^{17.69}$ | $1/2^{24.83}$ |
| 32 | 60 | $1/2^{15.10}$ | $1/2^{16.15}$ | $1/2^{24.48}$ |
| 32 | 80 | $1/2^{14.18}$ | $1/2^{14.41}$ | $1/2^{24.19}$ |
| 32 | 100 | $1/2^{12.32}$ | $1/2^{13.18}$ | $1/2^{23.96}$ |
| 32 | 120 | $1/2^{11.70}$ | $1/2^{12.62}$ | $1/2^{23.75}$ |
| 32 | 140 | $1/2^{11.46}$ | $1/2^{12.35}$ | $1/2^{23.57}$ |
| 32 | 160 | $1/2^{11.18}$ | $1/2^{12.11}$ | $1/2^{23.42}$ |
| 32 | 180 | $1/2^{10.96}$ | $1/2^{11.65}$ | $1/2^{23.27}$ |
| 32 | 200 | $1/2^{10.59}$ | $1/2^{11.44}$ | $1/2^{23.14}$ |
| 64 | 40 | $1/2^{45.11}$ | $1/2^{46.45}$ | $1/2^{56.30}$ |
| 64 | 60 | $1/2^{40.65}$ | $1/2^{41.35}$ | $1/2^{56.05}$ |
| 64 | 80 | $1/2^{37.76}$ | $1/2^{38.83}$ | $1/2^{55.83}$ |
| 64 | 100 | $1/2^{36.08}$ | $1/2^{37.53}$ | $1/2^{55.64}$ |
| 64 | 120 | $1/2^{34.96}$ | $1/2^{36.21}$ | $1/2^{56.48}$ |
| 64 | 140 | $1/2^{34.04}$ | $1/2^{35.02}$ | $1/2^{55.33}$ |
| 64 | 160 | $1/2^{32.77}$ | $1/2^{33.89}$ | $1/2^{55.19}$ |
| 64 | 180 | $1/2^{32.10}$ | $1/2^{31.71}$ | $1/2^{55.07}$ |
| 64 | 200 | $1/2^{29.66}$ | $1/2^{30.49}$ | $1/2^{54.96}$ |

GENERATING CRYPTOGRAPHIC CHECKSUMS

CROSS-REFERENCE TO RELATED APPLICATION(S)

This application is a 35 U.S.C. § 371 National Phase Entry Application from PCT/EP2014/063632, filed Jun. 27, 2014, and designating the United States.

TECHNICAL FIELD

The invention relates to a method of generating a cryptographic checksum, a corresponding computer program, a corresponding computer program product, and a checksum generator for generating a cryptographic checksum.

BACKGROUND

Current third generation (3G) and fourth generation (4G) $3^{rd}$ Generation Partnership Project (3GPP) mobile networks typically use encryption as well as authentication in the control plane, whereas the user plane is protected by encryption only. WiMAX and Wireless Local Area Networks (WLAN)/WiFi networks on the other hand use authentication also for the user plane.

A known way of protecting user plane messaging is to use authentication tags which are generated by applying keyed cryptographic hash functions to messages, such as keyed-Hash Message Authentication Codes (HMAC) or Cipher Block Chaining Message Authentication Codes (CBC-MAC). A cryptographic hash function is a hash function that generates a cryptographic hash value, also known as message digest, for an arbitrary block of data, such as a message, such that any accidental or intentional change to the message, i.e., an error or modification, will change the hash value, at least with a certain high probability. Accordingly, the message digest can be used for providing integrity assurance on the message.

The problem with keyed cryptographic hash functions is that they are comparatively resource consuming, which hampers their use in constrained devices, i.e., devices with limited computing and battery resources such as Machine-to-Machine (M2M) and Internet-of-Things (IoT) types of devices. In addition, the increase in message length due to the message digest reduces the payload portion of the transmitted data and increases power consumption.

Some level of protection against random errors can be achieved by using Cyclic Redundancy Check (CRC) codes. CRC codes are a type of separable cyclic codes which are very resource-efficient and widely used in data communication and data storage for detecting burst errors. CRC processing can be efficiently implemented with Linear-Feedback Shift Registers (LFSRs). Common CRCs are (CRC-n means that a generator polynomial of degree n is used for encoding and decoding the CRC, where the degree is the largest coefficient of the CRC's generator polynomial):

CRC-16-CDMA2000: used in 3G mobile networks
CRC-CCITT: used in Bluetooth
CRC-32: used in Ethernet and High-Level Data Link Control (HDLC) protocols
CRC-40-GSM: used in GSM control channel.

A CRC with a generator polynomial of degree n is able to detect all burst errors of length less than or equal to n and any error which is not a multiple of the generator polynomial.

While traditional CRC techniques are suitable for detecting random errors, they can easily be defeated by a malicious adversary. Since it is known to an adversary which generator polynomial is used by a certain CRC, he may easily craft a modified message which passes the CRC check at the receiver. This may, e.g., be achieved by adding to the original message an error which corresponds to a multiple of the generator polynomial.

A more resource efficient solution for providing data integrity in the user plane is to replace the conventional CRC by a cryptographically secure CRC, in the following also referred to as cryptographic CRC or cryptographic checksum. A cryptographic CRC has the same capability of detecting random errors as a traditional CRC, but is also capable of detecting, with high probability, any malicious error injected by an adversary.

A type of cryptographically secure CRC was proposed by Krawczyk [H. Krawczyk, "LFSR-based Hashing and Authentication", in Advances in Cryptology—CRYPTO '94, Lecture Notes in Computer Science, Volume 839, Springer, 1994, pp. 129-139]. The proposed CRC requires an irreducible polynomial of degree n for generating the authentication tag, i.e., the CRC check bits. The basic idea is to let the CRC polynomial be a shared secret, known only to sender and receiver. This works satisfactorily from a security point of view, but still suffers from being resource inefficient since it is not trivial to find irreducible polynomials. Generating an irreducible polynomial, i.e., a polynomial which cannot be factored into the product of two or more non-trivial polynomials, requires either pseudo-randomly generating a polynomial and running a test for irreducibility, or pseudo-randomly selecting polynomials from a database of irreducible polynomials. The computational complexity of tests for irreducibility is of order $n^3$ bit operations [see, e.g., S. Gao and D. Panario, "Tests and Constructions of Irreducible Polynomials over Finite Fields" in Foundations of Computational Mathematics, F. Cucker and M. Shub (Eds.), Springer, 1997, pp. 346-361], which is computationally demanding. Maintaining a database of irreducible polynomials is space consuming, since the number of irreducible polynomials for the most common CRC length, n=32, is $2^{27}$, requiring 512 Mbytes of storage. In general, the number of irreducible degree-n polynomials over binary fields grows like $2^n/n$.

SUMMARY

It is an object of the invention to provide an improved alternative to the above techniques and prior art.

More specifically, it is an object of the invention to provide an improved authentication of messages. In particular, it is an object of the invention to provide an improved cryptographic checksum with a known level of security.

These and other objects of the invention are achieved by means of different aspects of the invention, as defined by the independent claims. Embodiments of the invention are characterized by the dependent claims.

According to a first aspect of the invention, a method of generating a cryptographic checksum for a message M(x) is provided. The method comprises pseudo-randomly selecting a generator polynomial p(x) from the set of polynomials of degree n over a Galois Field. The generator polynomial is pseudo-randomly selected based on a first cryptographic key. The method further comprises calculating the cryptographic checksum as a first function g of a division of a second function of M(x), $f(M(x))$, modulo p(x), $g(f(M(x)) \mod p(x))$.

According to a second aspect of the invention, a computer program is provided. The computer program comprises computer-executable instructions for causing a device to perform the method according to an embodiment of the first aspect of the invention, when the computer-executable instructions are executed on a processing unit comprised in the device.

According to a third aspect of the invention, a computer program product is provided. The computer program product comprises a computer-readable storage medium which has the computer program according to the second aspect of the invention embodied therein.

According to a fourth aspect of the invention, a checksum generator for generating a cryptographic checksum for a message $M(x)$ is provided. The checksum generator comprises means which are configured for pseudo-randomly selecting a generator polynomial $p(x)$ from the set of polynomials of degree n over a Galois Field. The generator polynomial is pseudo-randomly selected based on a first cryptographic key. The means are further configured for calculating the cryptographic checksum as a first function g of a division of a second function of $M(x)$, $f(M(x))$, modulo $p(x)$, $g(f(M(x)) \bmod p(x))$.

The invention makes use of an understanding that an efficient authentication of a message may be provided by replacing the standard checksum, such as a CRC, with a cryptographic checksum which is based on a pseudo-randomly selected generator polynomial. The proposed cryptographic checksum may be used for providing integrity assurance on the message, i.e., for detecting random and intentional message changes, with a known level of security which is derived further below.

In the present context, a message is binary-coded information which frequently is cast into a certain format. The format may be dictated by a protocol to which the message relates. Typically, the message comprises a header and payload, and the cryptographic checksum is preferably generated for the entire message, i.e., header and payload.

Embodiments of the invention are advantageous over the prior art in that, by replacing a conventional CRC with a cryptographic checksum which has the same capability of detecting random errors as the traditional CRC while additionally providing integrity assurance for a message, the message format is not changed. In particular, the length of the message is not increased, in contrast to known solutions which are based on adding additional MACs to the message. Moreover, embodiments of the invention are advantageous over the known cryptographic CRC by Krawczyk in that they do not rely on generating pseudo-random irreducible polynomials, which incurs resource demanding processing or storage.

Note that, in the present context, it is to be understood that the generator polynomial $p(x)$ is pseudo-randomly selected from the set of all polynomials of degree n over a Galois Field. The selection may be controlled by means of a probability distribution for the polynomials. Such a probability distribution may effectively limit the set of available polynomials. In practice, maintaining a database of only a subset of all polynomials of degree n over a Galois Fields amounts to enforcing a probability distribution which has zero probability for the polynomials which are not contained in the database. According to an embodiment of the invention, the generator polynomial $p(x)$ is a reducible polynomial, i.e., a polynomial which is expressible as the product of two or more polynomials of lower degree. Thus, the generator polynomial is pseudo-randomly selected from a first subset of the set of polynomials of degree n over the Galois Field, which first subset comprises the reducible polynomials of degree n over the Galois Field. Accordingly, a second subset comprising the irreducible polynomials of degree n over the Galois Field, and which is disjoint from the first subset, is not used for selecting the generator polynomial.

According to an embodiment of the invention, the generator polynomial $p(x)$ comprises a non-zero constant term. Limiting the set of polynomials from which the generator polynomials is pseudo-randomly selected to the subset of polynomials which have a non-zero constant term is advantageous in that a cryptographic checksum based on such a generator polynomial has the ability to detect the same type of burst errors as a cryptographic CRC based on an irreducible generator polynomial, as is described further below.

According to an embodiment of the invention, the method further comprises pseudo-randomly generating a pad s of length n, wherein the first function g comprises an addition with the pad s. Adding a pseudo-randomly generated pad is advantageous in that the linear transformation of generating a cryptographic checksum by means of a hash function is converted into an affine transformation. In absence of the pad, an adversary may successfully inject an all-zero message. Optionally, the pad may be generated based on a second cryptographic key, which may be equal to, or different from, the first cryptographic key.

According to an embodiment of the invention, at least one of the generator polynomial $p(x)$ and the pad s is dependent on information which is specific for the message. That is, the generator polynomial, the pad, or both, is/are selected or generated based on message specific information in a way which is only known to the sender and the receiver of the messages while appearing random to an adversary. The message specific information may, e.g., comprise any one or a combination of a message sequence number, a message identifier, a time stamp comprised in the message, or the like.

According to an embodiment of the invention, a method of a sender of authenticating a message is provided. The method comprises acquiring the message, generating a cryptographic checksum for the message, appending the generated cryptographic checksum to the message, and transmitting the message and the appended cryptographic checksum. The message and the appended cryptographic checksum are commonly referred to as codeword.

According to an embodiment of the invention, a method of a receiver of authenticating a message is provided. The method comprises receiving the message and an appended first cryptographic checksum, generating a second cryptographic checksum for the message, and verifying if the first cryptographic checksum and the second cryptographic checksum are identical. If not, the integrity of the message could not be established. That is, the message has been modified, either intentionally or accidentally.

Even though advantages of the invention have in some cases been described with reference to embodiments of the first aspect of the invention, corresponding reasoning applies to embodiments of other aspects of the invention.

Further objectives of, features of, and advantages with, the invention will become apparent when studying the following detailed disclosure, the drawings and the appended claims. Those skilled in the art realize that different features of the invention can be combined to create embodiments other than those described in the following.

BRIEF DESCRIPTION OF THE DRAWINGS

The above, as well as additional objects, features and advantages of the invention, will be better understood through the following illustrative and non-limiting detailed description of embodiments of the invention, with reference to the appended drawings, in which:

FIG. 4 shows a table with collision probabilities for different types of generator polynomials.

All the figures are schematic, not necessarily to scale, and generally only show parts which are necessary in order to elucidate the invention, wherein other parts may be omitted or merely suggested.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein. Rather, these embodiments are provided by way of example so that this disclosure will be thorough and complete, and will fully convey the scope of the invention to those skilled in the art.

Figure 1:
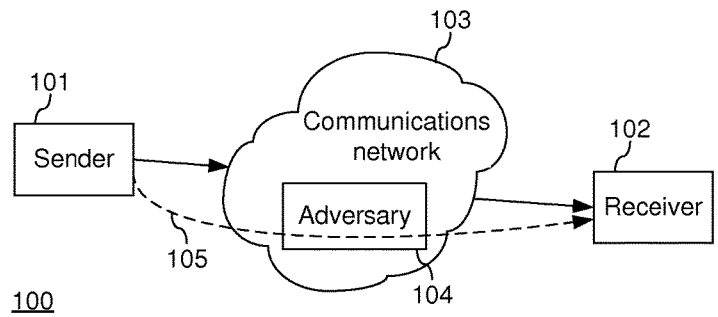
FIG. 1 shows a communication system.

In FIG. 1, a communication system 100 is illustrated which comprises a sender 101 and a receiver 102 configured for communicating over a communications network 103. In particular, sender 101 is configured for transmitting a message 105, and receiver 102 is configured for receiving message 105. Preferably, sender 101 and receiver 102 are configured for transmitting and receiving messages. Sender 101 and receiver 102 may be any type of device capable of effecting communications over communications network 103, such as computers, mobile terminals, User Equipments (UEs), M2M/IoT type of devices, nodes of a Radio Access Network (RAN), such as gateways, Radio Network Controllers (RNCs), Radio Base Stations (RBSs), NodeBs, or eNodeBs. Communications network 103 may be any one, or a combination of, a wired or wireless network, e.g., a RAN such as GSM, UMTS, LTE, a WLAN/WiFi network, an Ethernet network, a corporate network, the Internet, or the like.

Message 105 which is transmitted from sender 101 to receiver 102 via communications network 103 may be subject to modifications, either random/unintentional or intentional/malicious. Random modifications may, e.g., be caused by burst errors occurring during transmission over an air interface of a wireless network of communications network 103. Malicious modifications on the other hand may originate from an adversary 104 which is also illustrated in FIG. 1. Adversary 104 may intercept message 105 transmitted by sender 101 and re-transmit a modified copy of the message to receiver 102. Adversary 104 may also attempt to generate new messages without relying on modifications of messages received from sender 101. Typically, the intent of adversary 104 is to inject malicious messages into receiver 102, in particular a network interface, operating system, or application, of receiver 102.

It is known in the art to detect random modifications of message 105 by means of an integrity assurance on message 105. This may be achieved by providing message 105 with a checksum, such as a CRC, as is illustrated in FIG. 2.

Figure 2:
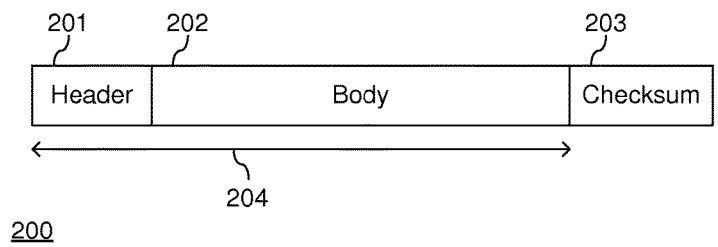
FIG. 2 shows a codeword.

To this end, a checksum 203, such as a CRC, is generated for a message 204, which in FIG. 2 is illustrated as comprising a header 201 and a body 202 carrying payload, and appended to message 204 to form a codeword 200. Codeword 200 (corresponding to message 105 in FIG. 1) is then transmitted to receiver 102 where the integrity of message 204 is verified, as is described in the following with reference to FIG. 3, which shows a block diagram 300 illustrating the sender side (left in FIG. 3) and the receiver side (right in FIG. 3), corresponding to sender 101 and receiver 102, respectively, of FIG. 1.

At sender 101, message 204 which is to be transmitted to receiver 102 is acquired, e.g., received from a higher layer of a protocol stack of sender 101, and fed into an algorithm 301 configured for calculating a first checksum (CS in FIG. 3) 203, in particular a CRC. In addition to message 204, checksum algorithm 301 receives a shared secret as input, e.g., a cryptographic key, and generates first checksum 203 as output. Optionally, checksum algorithm 301 may additionally receive an Initialization Value (IV) as input, based on which first checksum 203 is generated. The IV may be a separate input to checksum algorithm 301, or it may be input as part of message 204, e.g., by prepending or appending it to message 204. Then, message 204 and checksum 203 are combined into codeword 200, e.g., by appending checksum 203 to message 204. Codeword 200 is then transmitted to receiver 102, e.g., via communications network 103.

At receiver 102, codeword 200 is received and a message 304 is extracted from codeword 200. Note that message 304 is not necessarily identical to message 204 transmitted by sender 101, owing to random and/or intentional modifications of message 204 during transmission 105 from sender 101 to receiver 102. Message 304 is fed into checksum algorithm 301 which is identical to checksum algorithm 301 of sender 101 and which generates a second checksum 303 (CS' in FIG. 3) based on message 304 and further based on a shared secret which is identical to the shared secret of sender 101. Optionally, checksum algorithm 301 may additionally receive an IV as input which is identical to the IV of sender 101. Then, the integrity of received message 304 is verified by feeding the second checksum 303 into a comparator 305 and comparing it to the first checksum 203 extracted from the received codeword 200. The result of the comparison is made available by comparator 305 for further use, e.g., for a higher layer of a communication stack of receiver 102, and indicates whether the first checksum 203 and the second checksum 303 are identical or not. For instance, the result output by comparator 305 may be a Boolean value, wherein a high value (Boolean "1") indicates that the two checksums are identical and a low value (Boolean "0") indicates that the two checksums differ, or vice versa. If identical, the integrity of message 304 is assured, i.e., message 304 received by receiver 102 is identical to message 204 transmitted by sender 101. By verifying the integrity of message 304, it can be inferred with a certain probability that message 304 has not been modified during transmission 105.

Known checksums, in particular CRCs which are cryptographic hash functions like HMAC or CBC-MAC, are designed for detecting random modifications of a message. More specifically, a CRC with a generator polynomial p(x) of degree n is capable of detecting all burst errors of length less than or equal to n. Furthermore, a CRC will detect any error which is not a multiple of its generator polynomial p(x). Encoding and decoding of CRCs can efficiently be implemented by hardware, using Linear-Feedback Shift Registers (LFSRs), and software.

For encoding at sender 101, message M(x) 204 is typically first multiplied by $x^n$ and then divided modulo generator polynomial p(x). The polynomial coefficients of the remainder, $$r(x)=M(x)\cdot x^n \bmod p(x) \qquad (1).$$

constitute the CRC checksum 203, i.e., the message digest, and are appended to the data bits, $M(x)\cdot x^n$, to form codeword 200. Throughout this disclosure, "·" is a finite GF multiplication (which for the finite GF(2) is equivalent to the Boolean AND operation) and "mod" is the remainder of polynomial modulo division in the finite field. Note that multiplication by $x^n$ shifts message M(x) 204 by n bits. That is, message M(x) 204 is shifted before combining with CRC checksum 203. As a result, the obtained codeword 200 is separable, i.e., the message bits are separated from the checksum bits.

For decoding at receiver 102, the received data bits $M'(x)\cdot x^n$ are divided modulo generator polynomial p(x), and the polynomial coefficients 303 of the resulting remainder, $$r'(x)=M'(x)\cdot x^n \bmod p(x) \qquad (2),$$

are compared with the CRC bits r(x) 203 received with codeword 200. If no error has occurred, i.e., message 204 has not been modified during transmission, the remainder r'(x) is the same as the received remainder r(x). A disagreement indicates an error, i.e., $M'(x) \neq M(x)$.

While traditional CRC techniques are useful for detecting random modifications or errors, adversary 104 may easily craft a modification to a message transmitted by sender 101 which passes the CRC check at receiver 102, since generator polynomial p(x) utilized by checksum algorithm 301 is not a secret known to sender 101 and receiver 102 only. For instance, adversary 104 may add to the transmitted message M(x) 204 an error e(x) corresponding to a polynomial which is a multiple of generator polynomial p(x), such that e(x) mod p(x)=0. Moreover, adversary 104 may simply replace message 204 transmitted by sender 101 by a different message 304, presumably with malicious content, encode it using the same checksum algorithm 301 as sender 101, and transmit it to receiver 102 where it passes the integrity check.

A resource efficient solution for providing data integrity, and in particular in the user plane, is to replace the conventional CRC by a cryptographically secure CRC, which has the same capability of detecting random errors as a traditional CRC but which is also capable of detecting, with high probability, any intentional or malicious modification. A consequence of using a cryptographically secure CRC of the same size as a traditional CRC is that existing protocol stacks can be extended to support message authentication without requiring to redesign the entire protocol stack in order to account for a change in message size.

The cryptographically secure CRC proposed by Krawczyk is based on the idea to let the generator polynomial be a shared secret, known only to sender 101 and receiver 102. Thereby, adversary 104 cannot design messages so as to pass the integrity check at receiver 102. This works satisfactorily from a security point of view, but still suffers from being resource inefficient since it is not trivial to find irreducible polynomials, as was discussed hereinbefore.

The embodiments of the invention which are described in the following are advantageous in that the integrity of message 105 transmitted from sender 101 to receiver 102 can be verified by means of a cryptographic checksum which is of the same size as a conventional CRC but which is capable of detecting intentional of malicious modifications with a high probability in addition to random errors, to which conventional CRCs are limited. In contrast to the cryptographic checksum proposed by Krawczyk, embodiments of the invention are further advantageous in that they are less resource demanding. In particular, by pseudo-randomly selecting an arbitrary generator polynomial rather than utilizing irreducible polynomials, computationally demanding tests for irreducibility or storage for maintaining a set of irreducible polynomials are not required.

Figure 3:
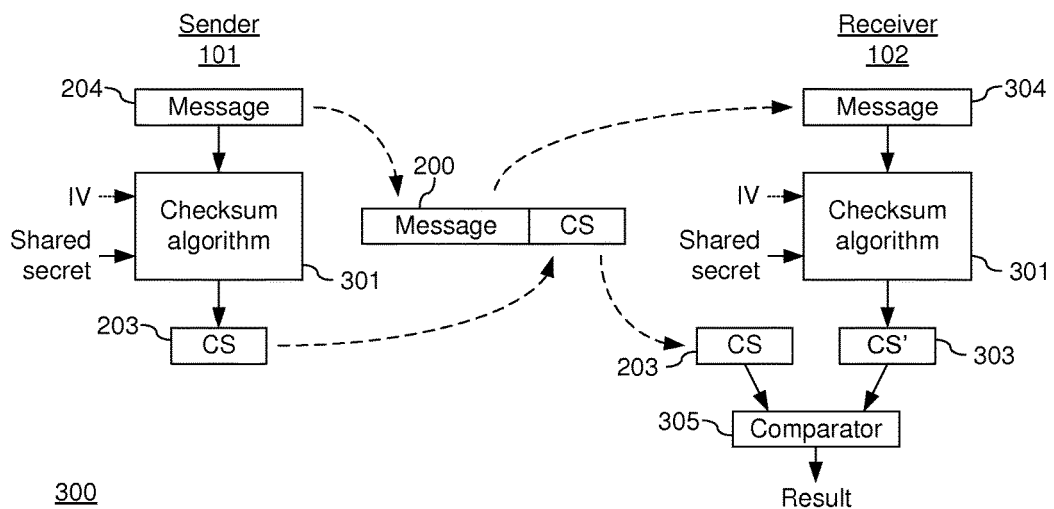
FIG. 3 shows a block diagram illustrating message authentication.

To this end, embodiments of the invention utilize a cryptographic checksum which replaces the conventional checksum 203, such as a CRC, in codeword 200 illustrated in FIGS. 2 and 3. Note that message 204, or parts thereof, e.g., body 202, may also be encrypted in some embodiments of the invention. In such case, receiver 102 may first decrypt the message, or parts of the message, before performing integrity verification. Alternatively, at least part of the decryption process may be interleaved or combined with the checksum verification. As yet a further alternative, there may be no need for receiver 102 to first decrypt the received message. The need to first decrypt the received message at receiver 102 is dependent on the order of processing at sender 101. For instance, if message encryption is applied at sender 101 after checksum 203 is generated and appended to message 204 to form codeword 200, receiver 102 typically first needs to decrypt the received codeword. On the other hand, if sender 101 first encrypts message 204 before computing checksum 203 over the encrypted message, then receiver 102 may postpone decryption until after checksum 203 has been calculated and the integrity of the received encrypted message has been verified. Throughout this disclosure, unless otherwise noted, we assume that decryption is performed as required.

Accordingly, checksum algorithm 301 which is used for generating cryptographically secure checksums at sender 101 (CS in FIG. 3) and receiver 102 (CS' in FIG. 3), respectively, is modified in comparison with that proposed by Krawczyk, as is described in the following.

Checksum algorithm 301 is a hash function $h_p(M)$ for generating a cryptographic checksum 203 for a message M(x) 204 and comprises generating a generator polynomial p(x) from the set of polynomials of degree n over a Galois Field, in particular the Galois Field of order 2, GF(2), and calculating cryptographic checksum 203 as a first function g of a division of a second function $f$ of M(x), $f(M(x))$, modulo p(x), i.e., $$h_p(M)=g(f(M(x)) \bmod p(x)) \qquad (3).$$

More specifically, generator polynomial p(x) is selected pseudo-randomly from the Galois Field based on a first cryptographic key, i.e., a shared secret which is known to sender 101 and receiver 102. The shared secret may, e.g., be established by public key techniques or symmetric techniques supported by Subscriber Identity Modules (SIM), Universal SIMs (USIMs), or the like, as is known in the art.

By pseudo-randomly selecting generator polynomial p(x) from the set of polynomials of the Galois Field rather than from the subset of irreducible polynomials, akin to Krawczyk, embodiments of the invention are advantageous in that message authentication is less resource consuming than prior art solutions, which is particularly important for constrained devices.

Optionally, generator polynomial p(x) may be a reducible polynomial, i.e., it is selected from a subset of the set of polynomials of degree n over the Galois Field, which subset comprises the reducible polynomials of degree n over the Galois Field. In the present context, a reducible polynomial is a polynomial which is expressible as the product of two or more polynomials both of strictly lower degree. The subset comprising the reducible polynomials is disjoint from the subset comprising the irreducible polynomials.

Further optionally, generator polynomial p(x) may comprise a non-zero constant term, i.e., $$p(x)=p'(x)+c \cdot x^0 \quad (4),$$

where c is non-zero (implying that c=1 in the case of polynomials over GF(2)). This is advantageous in that the generated cryptographic checksum has the ability to detect the same type of burst errors as the cryptographic checksum akin to Krawczyk which is based on an irreducible generator polynomial, as is derived further below. In contrast, generator polynomials having a zero constant term, i.e., c=0 in Eq. (4), may worsen the capabilities of detecting random errors. For example, a cryptographic checksum based on such a generator polynomial may not be able to detect some single-bit errors.

As yet a further option, the first function g may further comprise an addition with a pad s of length n, i.e., $$g(x)=t(M)+s \quad (5)$$

with $$t(M)=f(M(x)) \bmod p(x) \quad (6),$$

where "+" is the GF addition (which for GF(2) is equivalent to the Boolean XOR operation). Pad s may be generated pseudo-randomly, e.g., based on a second cryptographic key which may be identical to, or different from, the first cryptographic key. The first and/or the second cryptographic key may be generated from a third cryptographic key, e.g., by generating pseudo-random bit sequence from the third cryptographic key and some information known to sender 101 and receiver 102, and selecting a portion of the generated bit sequence to be the first cryptographic key and the remaining bits of the bit sequence to be the second cryptographic key. The addition of the random pad s is advantageous in that the linear transformation of generating a cryptographic checksum by means of hash function $h_p(M)$, i.e., $h_p(A)+h_p(B)=h_p(A+B)$, is converted into an affine transformation, $h_p(M)+s$. In absence of the pad, $h_p(0)=0$, irrespective of the generator polynomial used for the hash function, enabling an adversary to inject an all-zero message. Note that if encryption using a stream cipher is applied at sender 101, pad s may be provided by the encryption function, thus interleaving or combining encryption and integrity processing. In this case, receiver 102 may either (i) first remove pad s by decryption and then treat only $h_p(M)$ as checksum 203, or (ii) not remove pad s and rather treat $h_p(M)+s$ as checksum 203.

The pad used in embodiments of the invention is similar to the well-known one-time pad introduced by Vernam in the early 1900's. In the Vernam cipher, the message was combined bit-by-bit with the pad using the Boolean XOR operation. In embodiments of the invention, the pad is combined with the cryptographic checksum in a similar fashion.

In the following, the security of the proposed family hash functions for calculating cryptographic checksums in accordance with embodiments of the invention is analyzed and compared to prior art solutions, in particular the cryptographic checksums akin to Krawczyk.

We consider the (m, n)-family of cryptographically secure hash functions which is defined as follows. For any message M(x) of binary length m and for each generator polynomial p(x) of degree n over a Galois Field, a hash function $h_p$ is defined as the binary coefficients of the polynomial $$h_p(M)=M(x) \cdot x^n \bmod p(x) \quad (7).$$

In order to compute the authentication tag, i.e., the message digest or cryptographically secure checksum, $$t(M)=h_p(M)+s \quad (8),$$

a generator polynomial p(x) is pseudo-randomly drawn from the set of polynomials of degree n over the Galois Field, hash function $h_p$ (Eq. (7)) is evaluated, and a pseudo-randomly generated pad s is added (Eq. (8)), either explicitly or as part of an encryption/decryption process. It is again emphasized that generator polynomial p(x) is selected from the set of all polynomials of degree n over the Galois Field and is not limited to irreducible polynomials.

For the sake of analyzing the security of the proposed family of hash functions it is assumed that adversary 104 succeeds in breaking the authentication if, after seeing M(x) and t, adversary 104 can find a message M'(x)≠M(x) such that t'=t. It is assumed here that adversary 104 knows the (m, n)-family of hash functions, but not the particular hash function $h_p$ and the pad s which are used for authenticating a particular message.

The analysis is carried out by considering the distribution of checksums over all messages of a given length. Note that a worst-case scenario is considered here, i.e., it is assumed that adversary 104 will maximize his chances by trying to design checksums and we assume adversary 104 knows (and chooses) those messages which maximize the probability of success. Thus, probability of success will depend on the maximum probability that two different messages M and M' will have identical checksums t, calculated according to Eq. (8), since this means that adversary 104 can replace a message transmitted by sender 101 with another message without being detected, i.e., passing the integrity check at receiver 102. That is, we look for $$\max_{M,M'} Pr[h_p(M)=h_p(M')] \quad (9),$$

where the maximum is taken over all distinct m-bit messages M and M', and the probability Pr is taken over random choices of generator polynomial p(x) defining the hash function. Note that the probability is a statistical quantity, and the optimal strategy to predict a random event is to make predictions according to the statistical distribution of the event. For example, predicting whether a coin-flip (of a hypothetical, perfect coin) comes up heads or tails cannot be done with success greater than ½, no matter what resources are available. Therefore, Eq. (9) leads to an upper bound of any adversary's probability of success, no matter what computational resources adversary 104 may have at its disposal. Note that in Eq. (9), generator polynomial p(x) is not required to be irreducible, in contrast to the teachings of Krawczyk.

According Theorem 4 (see Appendix), for any value of m and n, and for any message M, no adversary can succeed in breaking the authentication with the cryptographic checksum based on a randomly selected generator polynomial with probability larger than $$\varepsilon_1 \leq R_{1,max}/2^n \quad (10),$$

where $R_{1,max}$ is the largest number of hash functions in the family which map M into a string c of length n, for any c. The probability ε is called the collision probability. $R_{1,max}$ is the maximum number of reducible polynomials of degree n which can be constructed from the irreducible factors of a polynomial of degree m+n. In Lemma 2 (see Appendix), a formula for the number of reducible polynomials of degree n which can be constructed from the irreducible polynomials of at most degree d is derived, given that each polynomial of degree d has a given multiplicity $k_d$. Moreover, according to Lemma 1 (see Appendix), the value of d can be chosen as the smallest integer which satisfies the equation $$d \geq \log(m+n+2)-1 \quad (11).$$

The best choice of multiplicities $k_1 \ldots k_d$ which maximize $R_{1,max}$ was found by an exhaustive search using a computer program for n=32 and m≤200, and for n=64 and m≤200. The values of the resulting collision probabilities $\varepsilon_1$ are shown in the third column of table 400 in FIG. 4.

In a similar way, we estimated the collision probability for the case of generator polynomials having a non-zero constant term (cf. Eq. (4)). According to Theorem 5 (see Appendix), for any value of m and n and for any message M, no adversary can succeed in breaking the authentication with the cryptographic checksum based on a generator polynomial with a non-zero constant term with probability larger than $$\varepsilon_2 \leq R_{2,max}/2^n \quad (11),$$

where $R_{2,max}$ is the largest number of hash functions in the family which map M into a string c of length n, for any c. $R_{2,max}$ is the maximum number of reducible polynomials of degree n having an non-zero constant term and which can be constructed from the irreducible factors of a polynomial of degree m+n. In Lemma 4 (see Appendix), a formula for the number of such reducible polynomials of degree n which can be constructed from the irreducible polynomials of at most degree d is derived, given that each polynomial of degree d has a given multiplicity $k_d$. Moreover, according to Lemma 3 (see Appendix), the value of d can be chosen as the smallest integer which satisfies the equation $$d \geq \log(m+n+3)-1 \quad (12).$$

The best choice of multiplicities $k_1 \ldots k_d$ which maximize $R_{2,max}$ was found by an exhaustive search using a computer program for n=32 and m≤200, and for n=64 and m≤200. The values of the resulting collision probabilities $\varepsilon_2$ are shown in the fourth column of table 400.

For comparison, the fifth column of table 400 shows the values of collision probabilities $\varepsilon_0$ for the case of irreducible generator polynomials akin to Krawczyk, in which case the collision probability is given by $(m+n)/2^{n-1}$.

As one can see from table 400, for the randomly selected generator polynomials (third column) and the randomly selected generator polynomials with non-zero constant term (fourth column), the respective collision probabilities are higher than for the irreducible polynomials akin to Krawczyk (fifth column). That is, they provide a lower level of security for a given message size. Accordingly, there is a trade-off between security and resource efficiency. For applications for which a lower level of security is acceptable, embodiments of the invention are advantageous in that they are less resource demanding. It can also be seen from table 400 that the proposed cryptographic checksums may be particularly advantageous for short messages, since the level of security provided by embodiments of the invention decays quicker with message size than for the cryptographic checksums akin to Krawczyk.

Note that while the security analysis presented herein is based on the assumption of uniformly random parameters, e.g., polynomials, these parameters are in practice generated pseudo-randomly. This distinction is, however, not of importance since pseudo-random generators are known which produce an output distribution which in practice cannot be distinguished from a uniform distribution. Thus, an adversary cannot exploit these differences in distributions.

Embodiments of the invention are based on an, for adversary 104, unpredictable change of at least one of generator polynomial p(x) and pad s in a fashion which is deterministic for sender 101 and receiver 102. That is, the change of the generator polynomial p(x) and/or the pad s has to be synchronized between sender 101 and receiver 102.

The shared secret based on which the generator polynomial is pseudo-randomly selected, i.e., the first cryptographic key, is intended to make the output of checksum algorithm 301 unpredictable for adversary 104, but checksum algorithm 301 may optionally determine the generator polynomial based on some message dependent data, such as a sequence number of the message or some other unique information in the message, e.g., a time stamp, a message identifier, or a random number. Such additional information may, e.g., be carried in header 201 of message 204.

In general, it may not be required to compute a new generator polynomial for each message, but it suffices to generate the generator polynomial at the beginning of a new session between sender 101 and receiver 102 and keep it fixed for all messages which are exchanged between sender 101 and receiver 102 during the session. The pad, however, then has to be changed for each message and may be changed dependent on message dependent data, i.e., information which is specific for the message.

Figure 5:
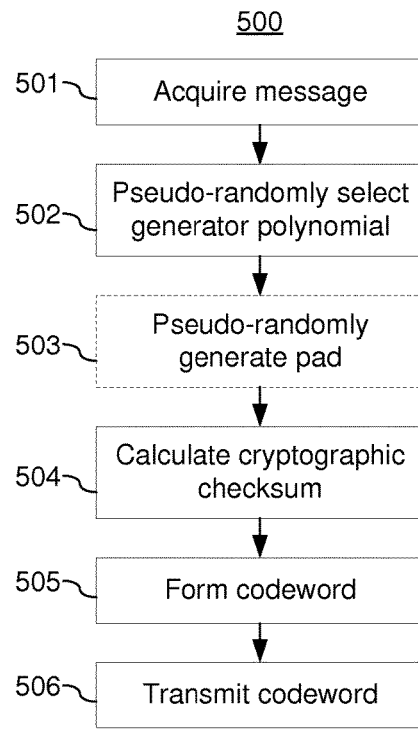
FIG. 5 shows a flow chart for a method of a sender, in accordance with an embodiment of the invention.

In FIG. 5, an embodiment 500 of the method of a sender of authenticating a message is illustrated. An embodiment of method 500 may, e.g., be performed by sender 101. Method 500 comprises acquiring 501 the message, e.g., from a higher layer of a communication stack of sender 101 or an application being executed by sender 101, generating a cryptographic checksum for the message, forming a codeword by appending 505 the generated cryptographic checksum to the message, and transmitting 506 the codeword, i.e., the message and the appended cryptographic checksum.

More specifically, generating the cryptographic checksum comprises pseudo-randomly selecting 502, based on a first cryptographic key, a generator polynomial p(x) from the set of polynomials of degree n over a Galois Field, and calculating 504 the cryptographic checksum as a first function g of a division of a second function of M(x), f(M(x)), modulo p(x), (f(M(x)) mod p(x)), as was described hereinbefore. The first cryptographic key is a shared secret known to the sender and the receiver of the message. Optionally, the generator polynomial may be a reducible polynomial and may comprise a non-zero constant term. Generating the cryptographic checksum may further comprise pseudo-randomly generating 503 a pad s of length n, wherein the first function g comprises an addition with the pad s. Pad s may be generated based on a second cryptographic key which may be equal to, or different from, the first cryptographic key. The second and the first cryptographic keys are shared secret known to the sender and the receiver of the message. Optionally, at least one of generator polynomial p(x) and pad s, or both, may be generated dependent on information which is specific for the message, such as a message sequence number, a time stamp, a random number, or the like.

Figure 6:
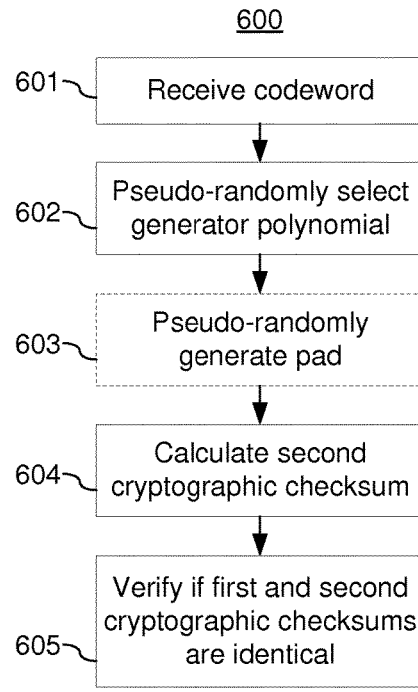
FIG. 6 shows a flow chart for a method of a receiver, in accordance with an embodiment of the invention.

In FIG. 6, an embodiment 600 of the method of a receiver of authenticating a message is illustrated. An embodiment of method 600 may, e.g., be performed by receiver 102. Method 600 comprises receiving 601 a codeword, i.e., the message and an appended first cryptographic checksum, generating a second cryptographic checksum for the message, and verifying 605 if the first cryptographic checksum and the second cryptographic checksum are identical. If not, the integrity of the message could not be established. That is, the message has been modified, either accidentally/randomly or intentionally/maliciously.

More specifically, generating the second cryptographic checksum comprises pseudo-randomly selecting 602, based on a first cryptographic key, a generator polynomial p(x) from the set of polynomials of degree n over a Galois Field, and calculating 604 the second cryptographic checksum as a first function g of a division of a second function of M(x), ƒ(M(x)), modulo p(x), (ƒ(M(x))mod p(x)), as was described hereinbefore. The first cryptographic key is a shared secret known to the sender and the receiver of the message. Optionally, the generator polynomial may be a reducible polynomial and may comprise a non-zero constant term. Generating the second cryptographic checksum may further comprise pseudo-randomly generating 603 a pad s of length n, wherein the first function g comprises an addition with the pad s. Pad s may be generated based on a second cryptographic key which may be equal to, or different from, the first cryptographic key. The second and the first cryptographic keys are shared secret known to the sender and the receiver of the message. Optionally, at least one of generator polynomial p(x) and pad s, or both, may be generated dependent on information which is specific for the message, such as a message sequence number, a time stamp, a random number, or the like.

The computation of cryptographic checksums in accordance with embodiments of the invention is based on the same type of operations as are used for conventional CRCs. Therefore, it retains most of the simplicity of traditional CRCs except that embodiments of the invention utilize a variable pseudo-random generator polynomial. Accordingly, implementing embodiments of the invention in hardware is simple, and the resulting implementations are very resource efficient. The operation of division modulo a polynomial over GF(2) may be implemented through an LFSR, where the taps of the LFSR determine the generator polynomial p(x), as is known in the art. Even multiplication by $x^n$ can be implemented in hardware with high performance. However, in contrast to traditional CRCs, where the generator polynomial is fixed and known in advance and the implementing circuits typically have feedback connections which determine the generator polynomial hardwired, a cryptographic checksum in accordance with embodiments of the invention requires an implementation in which the feedback connections are programmable. It is the actual configuration of these feedback connections which is the key for the hashing and which should be changeable and secret. Note that some non-cryptographic CRC circuits also may use programmable connections if they need to support different CRC standards based on different generator polynomials, or to support different polynomial degrees [see, e.g., J. Birch, L. G. Christensen, and M. Skov, "A programmable 800 Mbit/s CRC check/generator unit for LAN6 and MANs", Comp. Networks and ISDN Sys., 1992].

It is important to point out that restricting the set of pseudo-randomly selected generator polynomials to the set of polynomials having a non-zero constant term does not complicate the implementation of a checksum generator in accordance with embodiments of the invention. The only difference is that, for such polynomials, the LFSR tap corresponding to the constant term of the polynomial may be fixed rather than programmable.

Efficient implementations of CRC generators in software exist, too. In these implementations, significant speed up is achieved by using pre-computed tables which depend on the particular cryptographic key based on which the generator polynomial is pseudo-randomly selected. Therefore, they are computed only once per cryptographic key, which is affordable in many applications.

The functions in the hash function family according to embodiments of the invention are essentially defined by the generator polynomial p(x), and not by the length of the messages to which the hash functions are applied. Therefore, they can be applied to messages of different lengths, as is desirable in practice. In particular, the polynomial corresponding to a message M(x) should have "1" as leading coefficient, rather than "0" (if M is of length m, then M(x) is of proper degree m). This determines a one-to-one mapping between messages and polynomials and, in particular, prevents changing the message by just appending zeros to it. For instance, a message 01011 should be treated as a 4-bit message 1011 rather than as a 5-bit message. Otherwise, both messages are represented by the same message polynomial $1 \cdot x^3 + 0 \cdot x^2 + 1 \cdot x^1 + 1 \cdot x^0 = x^3 + x^1 + 1$ and will accordingly have the same checksum after encoding. Otherwise an adversary could simply append one or more leading zeros to a message, knowing that the new message should have the same checksum. Alternatively, or additionally, an explicit length indication may be used as input to the authentication/verification process, e.g., by prepending or appending the message length to the message.

On the receiver side, verification of a message's integrity can be efficiently implemented by a Finite State Machine (FSM) which processes the message more or less simultaneously with the sequential reception of message elements, an element typically being a bit. Such FSMs may also be integrated within the Medium Access Control (MAC) layer of the receiver and typically consist of a checksum decoder, a comparator and a control block. The checksum decoder re-computes the check bits for the received message elements as they arrive one-by-one, i.e., bit-by-bit. The comparator compares the re-computed check bits with the check bits received in the message, i.e., the authentication tag or checksum. If the re-computed and the received check bits disagree, the comparator sends an error signal to the control block, indicating that the integrity of the message could not be verified.

Figure 7:
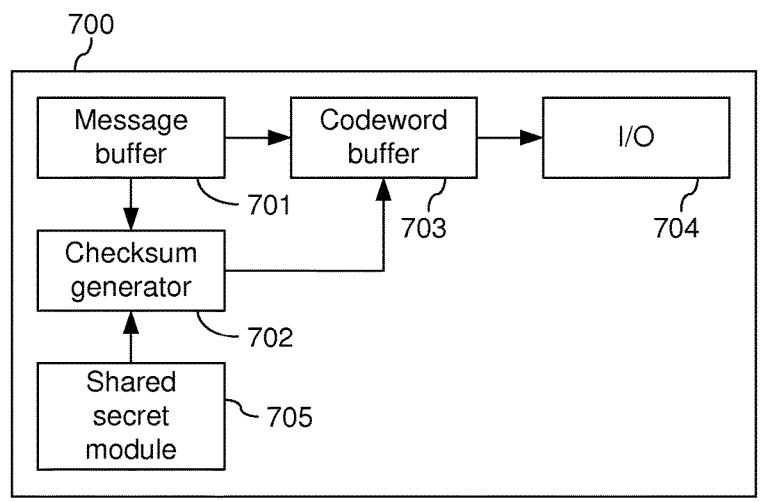
FIG. 7 shows a sender, in accordance with an embodiment of the invention.

In FIG. 7, an embodiment 700 of the sender for authenticating a message is illustrated, such as sender 101 shown in FIG. 1. Sender 700 comprises a message buffer 701 for acquiring the message, e.g., from a higher layer of a communication stack of sender 700 or an application being executed by sender 700, a checksum generator 702 for generating a cryptographic checksum for the message, a codeword buffer 703 for forming a codeword by appending the generated cryptographic checksum to the message, an interface 704 for transmitting the codeword, i.e., the message and the appended cryptographic checksum, and a shared secret module 705 for providing checksum generator

702 with a first cryptographic key, i.e., a shared secret known to sender 700 and the receiver of the message. Interface 704 may, e.g., be a network interface or a radio transceiver configured for effecting communications with a RAN.

More specifically, checksum generator 702 is configured for generating the cryptographic checksum by pseudo-randomly selecting, based on the first cryptographic key, a generator polynomial p(x) from the set of polynomials of degree n over a Galois Field, and calculating the cryptographic checksum as a first function g of a division of a second function of M(x), ƒ(M(x)), modulo p(x), (ƒ(M(x)) mod p(x)), as was described hereinbefore. Optionally, the generator polynomial may be a reducible polynomial and may comprise a non-zero constant term. Checksum generator 702 may further be configured for pseudo-randomly generating a pad s of length n, wherein the first function g comprises an addition with the pad s. Pad s may be generated based on a second cryptographic key which may be equal to, or different from, the first cryptographic key. The second cryptographic key is a shared secret known to sender 700 and the receiver of the message. Accordingly, shared secret module 705 may further be configured for providing the second cryptographic key to checksum generator 702. Alternatively, pad s may be provided by an encryption algorithm, as was described hereinbefore, rather than being generated by checksum generator 702.

Optionally, checksum generator 702 may be configured for generating at least one of generator polynomial p(x) and pad s, or both, dependent on information which is specific for the message, such as a message sequence number, a time stamp, a random number, or the like. Such information may be utilized as input to checksum generator 702, in particular to an LFSR comprised in checksum generator 702.

Figure 8:
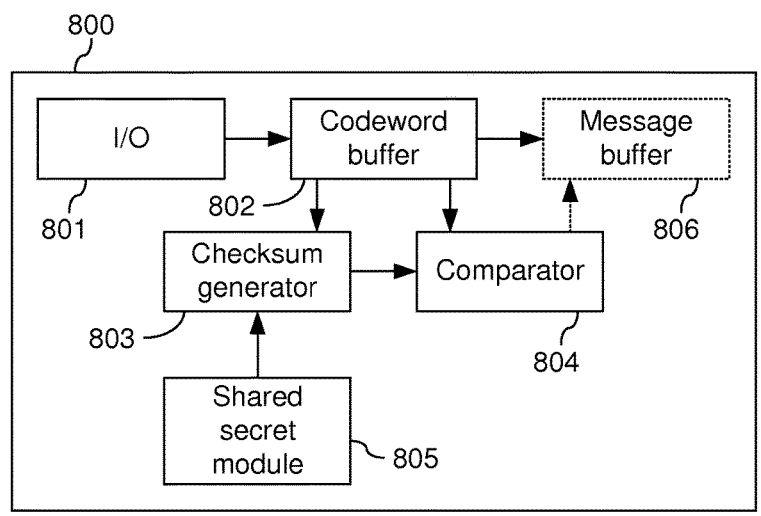
FIG. 8 shows a receiver, in accordance with an embodiment of the invention.

In FIG. 8, an embodiment 800 of the receiver for authenticating a message is illustrated, such as receiver 102 shown in FIG. 1. Receiver 800 comprises an interface 801 for receiving a codeword, i.e., the message and an appended first cryptographic checksum, a codeword buffer 802 for extracting the message and the first cryptographic checksum from the received codeword, a checksum generator 803 for generating a second cryptographic checksum for the message, a comparator 804 for verifying if the first cryptographic checksum and the second cryptographic checksum are identical, and a shared secret module 805 for providing checksum generator 803 with the first cryptographic key, i.e., a shared secret known to receiver 800 and the sender of the message. Receiver 800 may further comprise a message buffer 806 for storing the received message and passing the message to a higher layer of a communication stack of receiver 800 or an application being executed by receiver 800 in response to an indication received by comparator 804 that the integrity of the received message has been verified. Interface 801 may, e.g., be a network interface or a radio transceiver configured for effecting communications with a RAN.

More specifically, checksum generator 803 is similar to checksum generator 702 described with reference to FIG. 7 and is configured for generating the second cryptographic checksum by pseudo-randomly selecting, based on the first cryptographic key, a generator polynomial p(x) from the set of polynomials of degree n over a Galois Field, and calculating the second cryptographic checksum as a first function g of a division of a second function of M(x), ƒ(M(x)), modulo p(x), (ƒ(M(x))mod p(x)), as was described hereinbefore. Optionally, the generator polynomial may be a reducible polynomial and may comprise a non-zero constant term. Checksum generator 803 may further be configured for pseudo-randomly generating a pad s of length n, wherein the first function g comprises an addition with the pad s. Pad s may be generated based on a second cryptographic key which may be equal to, or different from, the first cryptographic key. The second cryptographic key is a shared secret known to receiver 800 and the sender of the message. Accordingly, shared secret module 806 may further be configured for providing the second cryptographic key to checksum generator 803. Alternatively, pads may be provided by an encryption algorithm, as was described hereinbefore, rather than being generated by checksum generator 803.

Optionally, checksum generator 803 may be configured for generating at least one of generator polynomial p(x) and pad s, or both, dependent on information which is specific for the received message, such as a message sequence number, a time stamp, a random number, or the like. Such information may be utilized as input to checksum generator 803, in particular to an LFSR comprised in checksum generator 803.

Embodiments of sender 700 and receiver 800 may be implemented in hardware, software, or a combination thereof, as is known in the art. For instance, modules 701-705 and modules 801-806 may be implemented by means of electronic circuitry, in particular digital binary logic. Alternatively, modules 701-705 and modules 801-806 may be implemented based on Digital Signal Processors (DSPs). It will be appreciated that interfaces 704 and 801 may comprise analog electronic circuitry configured for transmitting or receiving, respectively, the codeword over the air interface of a RAN.

Embodiments of checksum generators 702 and 803 operate very similar to standard CRC generators, the implementation of which is known in the art. Embodiments of checksum generators 702 and 803 which rely on a pseudo-randomly generated pad s may implement the addition of pad s by a bit-wise XOR operation between the n-bit string representing ƒ(M(x))mod p(x) and the n-bit pad s.

Figure 9:
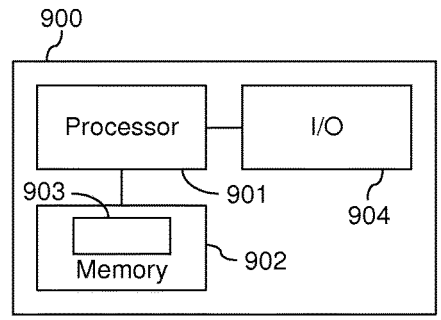
FIG. 9 shows a sender, in accordance with another embodiment of the invention.

In FIG. 9, an alternative embodiment 900 of the sender for authenticating a message is shown. Sender 900 comprises a processor 901, e.g., a DSP, a memory 902 comprising software, i.e., a computer program 903 comprising computer-executable instructions, for causing sender 900 to implement an embodiment of the method of a sender of authenticating a message described hereinbefore, in particular with reference to FIG. 5, when the computer-executable instructions are executed on processor 901. Sender 900 may further comprise an interface 904 for effecting communications via a communications network, e.g., communications network 103. Interface 904 may, e.g., be a network interface or a radio transceiver configured for effecting communications with a RAN.

Figure 10:
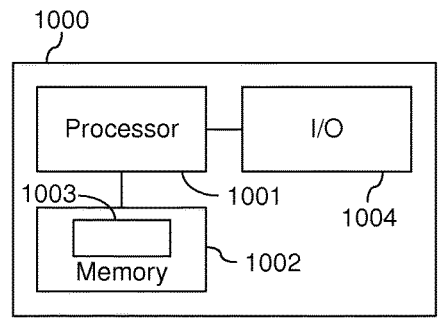
FIG. 10 shows a receiver, in accordance with another embodiment of the invention.

In FIG. 10, an alternative embodiment 1000 of the receiver for authenticating a message is shown. Receiver 1000 comprises a processor 1001, e.g., a DSP, a memory 1002 comprising software, i.e., a computer program 1003 comprising computer-executable instructions, for causing receiver 1000 to implement an embodiment of the method of a receiver of authenticating a message described hereinbefore, in particular with reference to FIG. 6, when the computer-executable instructions are executed on processor 1001. Receiver 1000 may further comprise an interface 1004 for effecting communications via a communications network, e.g., communications network 103. Interface 1004 may, e.g., be a network interface or a radio transceiver configured for effecting communications with a RAN.

Figure 11:
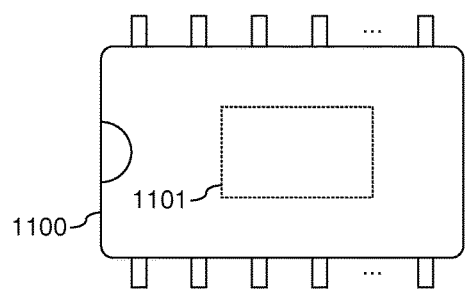
FIG. 11 shows an IC, in accordance with an embodiment of the invention.
Figure 12:
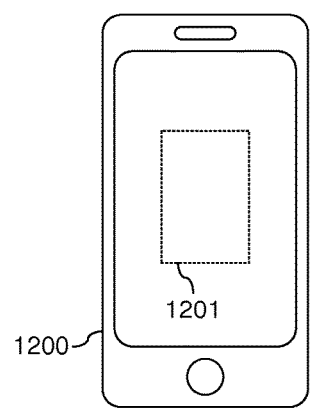
FIG. 12 shows a mobile phone, in accordance with an embodiment of the invention.

Embodiments 1101 of the sender and the receiver described with reference to FIGS. 7 to 10 may be implemented in an Integrated Circuit (IC) 1100 illustrated in in FIG. 11. Further, embodiments 1201 of the sender and the receiver described with reference to FIGS. 7 to 10 may also be implemented in a mobile terminal, such as mobile phone 1200 illustrated in FIG. 12. As yet a further alternative, embodiments 1201 of the sender and the receiver described with reference to FIGS. 7 to 10 may also be implemented in a node of a RAN, e.g., a gateway, an RNC, or a radio access node, such as an RBS, a NodeB, an eNodeB, a WLAN access point, or the like.

The person skilled in the art realizes that the invention by no means is limited to the embodiments described above. On the contrary, many modifications and variations are possible within the scope of the appended claims.

APPENDIX

It is known that a CRC based on an irreducible generator polynomial of degree n is capable of detecting all burst errors of length n or less.

Theorem 1

A CRC based on a generator polynomial of degree n with a non-zero constant term is capable of detecting the same type of burst errors as a CRC based on an irreducible generator polynomial of degree n.

Proof:

A CRC based on any generator polynomial $p(x)$ is capable of detecting all errors except those which are a multiple of $p(x)$. If $p(x)$ is a polynomial with a non-zero constant term, then all factors of $p(x)$ are polynomials with non-zero constant terms as well.

Any burst error of degree n>0 can be described by a polynomial of type $$b(x) = x^i \cdot a(x), \qquad (1)$$

where $$a(x) = x^{n-i-1} + x^{n-i-2} + \ldots + x + 1, \qquad (2)$$

for $i \in \{0, 1, \ldots, n-1\}$. The polynomial $b(x)$ is a multiple of $p(x)$ if and only if all factors of $p(x)$ are also factors of $b(x)$.

Since the degree of $p(x)$ is larger than the degree of $a(x)$ by at least 1, $p(x) \neq a(x)$. Therefore, to be a multiple of $b(x)$, $p(x)$ must be of type $p(x) = a(x) \cdot c(x)$, where $c(x)$ is a polynomial with a non-zero constant term of degree at least 1.

However, since all other factors of $b(x)$ except $a(x)$ are polynomials with zero constant terms, $c(x)$ cannot be a factor of $b(x)$. Thus, a CRC based on a generator polynomial of degree n with a non-zero constant term is capable of detecting all burst errors of length n or less.

Before presenting the analysis of collision probability of embodiments of the invention, some background definitions and theorems are presented here (Definitions 1 to 3 and Theorems 2 and 3 are from H. Krawczyk, "LFSR-based Hashing and Authentication", in Advances in Cryptology— CRYPTO '94, Lecture Notes in Computer Science, Volume 839, Springer, 1994, pp. 129-139).

Definition 1

A family of hash functions H is +-linear if, for all messages M and M', $$h(M+M') = h(M) + h(M'). \qquad (3)$$

Definition 2

A family of hash functions is called $\varepsilon$-balanced if for any non-zero message M of length m, and for any binary string c of length m, $$Pr[h_p(M) = c] \leq \varepsilon. \qquad (4)$$

Definition 3

A family of hash functions is called $\varepsilon$-opt-secure if, for any message M, no adversary succeeds in breaking the authentication with probability larger than $\varepsilon$.

Theorem 2

A necessary and sufficient condition for a family H of hash functions to be $\varepsilon$-opt-secure is that $$\forall M_1 \neq M_2 \text{ and } \forall c \in \{0,1\}^m, Pr[h(M_1) + h(M_2) = c] \leq \varepsilon. \qquad (5)$$

Theorem 3

If H is +-linear, then H is $\varepsilon$-opt-secure if and only if H is $\varepsilon$-balanced.

In the following, an analysis of the collision probability for embodiments of the invention is presented.

Theorem 4

For any values of n and m, the family of hash functions based on arbitrary generator polynomials is $\varepsilon$-opt-secure for $$\varepsilon_1 \leq \frac{R_{1,max}}{2^n},$$

where $R_{1,max}$ is the maximum number of distinct reducible polynomials of degree n which can be constructed from the irreducible factors of a polynomial of degree m+n.

Proof:

A family of hash functions is $\varepsilon$-opt-secure if it is +-linear and $\varepsilon$-balanced. The family of hash functions based on arbitrary generator polynomials is +-linear since a division modulo a polynomial is a linear operation, where addition is equivalent to a bit-wise XOR operation. To show that the family is also $\varepsilon$-balanced, note that for any polynomial $p(x)$ of degree n, and any non-zero message M of length m and any string c of length n, $h_p(M) = c$ if and only if $M(x) \cdot x^n \mod p(x) = c(x)$ if and only if $p(x)$ divides $M(x) \cdot x^n - c(x)$.

Denote $q(x) = M(x) \cdot x^n - c(x)$. Clearly, $q(x)$ is a non-zero polynomial of degree at most m+n, and $p(x)$ is a polynomial of degree n which divides $q(x)$. Let $R_{1,max}$ be the maximum number of distinct reducible polynomials of degree n which can be constructed from the irreducible factors of $q(x)$. Obviously, there are at most $R_{1,max}$ hash functions in the family that map M into c. On the other hand, there are $2^n$ elements in the family (the number of polynomials of degree n over GF(2)). Therefore, $$Pr[h_p(M) = c] \leq \frac{R_{1,max}}{2^n}. \qquad (6)$$

Next, an estimate for the value of $R_{1,max}$ is derived. Clearly, the more irreducible factors $q(x)$ has, the more reducible polynomials can be constructed from it. Further, the smaller the degree of the irreducible factors is, the more irreducible factors $q(x)$ can contain. Suppose that the factors of $q(x)$ represent all possible irreducible polynomials of degrees from 1 to d and that each polynomial appears with the multiplicity 1, i.e., $q(x)$ is of type:

$$q(x) = f_{1,1} \cdot \ldots \cdot f_{1,J_1} \cdot f_{2,1} \cdot \ldots \cdot f_{2,J_2} \cdot \ldots \cdot f_{d,1} \cdot \ldots \cdot f_{d,J_d} \qquad (7)$$

where $f_{i,j}$ stands for the jth irreducible polynomial of degree i and $I_i$ stands for the number of irreducible polynomials of degree i, for $i \in \{1, 2, \ldots, d\}$, $j \in \{1, 2, \ldots, I_i\}$.

First, the maximum value of d is estimated.

Lemma 1

Let q(x) be a polynomial of degree m+n of type according to Eq. (7). Then, d is the smallest integer which satisfies the equation $$d \geq \log(m+n+2)-1. \tag{8}$$

Proof:

The value of d should satisfy the equation $$I_1 + 2I_2 + \ldots + dI_d = m+n, \tag{9}$$

where $I_i$ stands for the number of irreducible polynomials of degree i. Since $$I_n \leq \frac{2^n}{n}, \tag{10}$$

and thus $$I_1 + 2I_2 + \ldots + dI_d \leq 2^1 + 2^2 + \ldots + 2^d, \tag{11}$$

it follows that $$m+n \leq 2^{d+1} - 2. \tag{12}$$

Therefore, d is the smallest integer which satisfies the equation $$\log(m+n+2) - 1 \leq d. \tag{13}$$

However, q(x) of type according to Eq. (7) typically does not maximize the value of $R_{1,max}$. In most cases, a higher value of $R_{1,max}$ may be obtained if factors of smaller degrees appear with multiplicity higher than 1, i.e., if q(x) is of the following type:

$$q(x) = f_{1,1}^{k_1} \cdot \ldots \cdot f_{1,I_1}^{k_1} \cdot f_{2,1}^{k_2} \cdot \ldots \cdot f_{2,I_2}^{k_2} \cdot \ldots \cdot f_{d,1}^{k_d} \cdot \ldots \cdot f_{d,I_d}^{k_d}, \tag{14}$$

where $f_{i,j}$ stands for the jth irreducible polynomial of degree i and $k_d = \lfloor n/d \rfloor$.

Let $R_1(n, d^{k_d}, \ldots, 2^{k_2}, 1^{k_1})$ be the number of reducible polynomials of degree n, n>0, which can be constructed from irreducible polynomials of degree at most d, given that each polynomial of degree d has multiplicity $k_d$. Next, a closed formula for $R_1(n, d^{k_d}, \ldots, 2^{k_2}, 1^{k_1})$ is derived.

Lemma 2

For d=1:

$$R_1(n, 1^{k_1}) = n + 1, \quad \text{for } k_1 \geq n \tag{15}$$

$$R_1(n, 1^{k_1}) = 2k_1 - n + 1, \quad \text{for } \left\lfloor \frac{n}{2} \right\rfloor \leq k_1 < n$$

$$R_1(n, 1^{k_1}) = 0, \quad \text{for } k_1 < \left\lfloor \frac{n}{2} \right\rfloor$$

and for d>1:

$$R_1(n, d^{k_d}, \ldots, 2^{k_2}, 1^{k_1}) = \tag{16}$$

$$\sum_{i_{d,1}=0}^{A_{d,1}} \sum_{i_{d,2}=0}^{A_{d,2}} \ldots \sum_{i_{d,I_d}=0}^{A_{d,I_d}} \sum_{i_{d-1,1}=0}^{A_{d-1,1}} \ldots \sum_{i_{3,1}=0}^{A_{3,1}} \sum_{i_{3,2}=0}^{A_{3,2}} \sum_{i_{2,1}=0}^{A_{2,1}} R_1$$

$$\left( n - 2i_{2,1} - 3(i_{3,1} + i_{3,2}) - \ldots - d\sum_{j=1}^{I_d} i_{d,j}, 1^{k_1} \right),$$

where $$A_{d,1} = \min\left( \left\lfloor \frac{n}{d} \right\rfloor, k_d \right) \tag{17}$$

$$A_{d,2} = \min\left( \left\lfloor \frac{n - d \cdot i_{d,1}}{d} \right\rfloor, k_d \right)$$

$$\ldots$$

$$A_{d,I_d} = \min\left( \left\lfloor \frac{n - d \sum_{j=1}^{I_d - 1} i_{d,j}}{d} \right\rfloor, k_d \right)$$

$$A_{d-1,1} = \min\left( \left\lfloor \frac{n - S(d:d)}{d-1} \right\rfloor, k_{d-1} \right)$$

$$\ldots$$

$$A_{3,1} = \min\left( \left\lfloor \frac{n - S(d:4)}{3} \right\rfloor, k_3 \right)$$

$$A_{3,2} = \min\left( \left\lfloor \frac{n - S(d:4) - 3i_{3,1}}{3} \right\rfloor, k_3 \right)$$

$$A_{2,1} = \min\left( \left\lfloor \frac{n - S(d:3)}{2} \right\rfloor, k_2 \right),$$

where $S(d:i) = \sum_{r=i}^{d} (r \cdot \sum_{j=1}^{I_r} i_{r,j})$.

Proof:

By induction on d. Basic case: Let d=1. It is easy to show that $$R_1(n, 1^{k_1}) = n + 1, \quad \text{for } k_1 \geq n \tag{18}$$

$$R_1(n, 1^{k_1}) = 2k_1 - n + 1, \quad \text{for } \left\lfloor \frac{n}{2} \right\rfloor \leq k_1 < n$$

$$R_1(n, 1^{k_1}) = 0, \quad \text{for } k_1 < \left\lfloor \frac{n}{2} \right\rfloor.$$

Inductive step: Assume that the theorem holds for d=d-1. Then, one can construct $R_1(n, (d-1)^{k_{d-1}}, \ldots, 2^{k_2}, 1^{k_1})$ reducible polynomials of degree n from irreducible polynomials of degree up to d-1, where $R_1(n, (d-1)^{k_{d-1}}, \ldots, 2^{k_2}, 1^{k_1})$ is given by Eq. (16). The number of reducible polynomials of degree n which can be constructed if, in addition to the irreducible polynomials of degree up to d-1, there is one irreducible polynomial of degree d which has multiplicity $$k_d \leq \left\lfloor \frac{n}{d} \right\rfloor,$$

is $$R_1(n, (d-1)^{k_{d-1}}, \ldots, 2^{k_2}, 1^{k_1}) + \tag{19}$$

$$R_1(n-d, (d-1)^{k_{d-1}}, \ldots, 2^{k_2}, 1^{k_1}) ++$$

$$R_1(n-2d, (d-1)^{k_{d-1}}, \ldots, 2^{k_2}, 1^{k_1}) ++$$

$$R_1(n-k_d \cdot d, (d-1)^{k_{d-1}}, \ldots, 2^{k_2}, 1^{k_1}) ==$$

-continued $$\sum_{i_{d,1}=0}^{k_d} \sum_{i_{d-1,1}=0}^{A_{d-1,1}} \cdots \sum_{i_{3,1}=0}^{A_{3,1}} \sum_{i_{3,2}=0}^{A_{3,2}} \sum_{i_{2,1}=0}^{A_{2,1}} R_1$$

$$(n - 2i_{2,1} - 3(i_{3,1} + i_{3,2}) - \ldots - d \cdot i_{d,1}, 1^{k_1})$$

polynomials. In a similar way, if in addition to the irreducible polynomials of degree up to d−1 there are $I_d$ irreducible polynomials of degree d which have multiplicity $k_d$, one obtains $$R_1(n, d^{k_d}, \ldots, 2^{k_2}, 1^{k_1}) = \tag{20}$$

$$\sum_{i_{d,1}=0}^{A_{d,1}} \sum_{i_{d,2}=0}^{A_{d,2}} \cdots \sum_{i_{d,I_d}=0}^{A_{d,I_d}} \sum_{i_{d-1,1}=0}^{A_{d-1,1}} \cdots \sum_{i_{3,1}=0}^{A_{3,1}} \sum_{i_{3,2}=0}^{A_{3,2}} \sum_{i_{2,1}=0}^{A_{2,1}} R_1$$

$$\left(n - 2i_{2,1} - 3(i_{3,1} + i_{3,2}) - \ldots - d\sum_{j=1}^{I_d} i_{d,j}, 1^{k_1}\right).$$

It is difficult to derive a closed formula for the values of multiplicities $k_1$, $k-2$, ..., $k_d$ which maximize $R_1(n, d^{k_d}, \ldots, 2^{k_2}, 1^{k_1})$. By an exhaustive search with the value of d bounded by Lemma 1, values for $R_1(n, d^{k_d}, \ldots, 2^{k_2}, 1^{k_1})$ for n=32 and n=64 and message length m≤200 have been computed. The values are illustrated in the following table, where the last column shows the multiplicities $k_1$, $k-2$, ..., $k_d$ which maximize $R_1(n, d^{k_d}, \ldots, 2^{k_2}, 1^{k_1})$.

| n | m | $R_{1, max}(n, d^{k_d}, \ldots, 1^{k_1})$ | $(k_1, \ldots, k_8)$ |
|---|---|---|---|
| 32 | 20 | 2273 | (7, 3, 1, 1, 0, 0, 0, 0) |
| 32 | 40 | 37118 | (6, 3, 2, 1, 1, 0, 0, 0) |
| 32 | 60 | 122363 | (9, 4, 2, 2, 1, 0, 0, 0) |
| 32 | 80 | 231066 | (4, 1, 1, 1, 1, 1, 0, 0) |
| 32 | 100 | 838626 | (8, 4, 2, 1, 1, 1, 0, 0) |
| 32 | 120 | 1286764 | (9, 4, 3, 2, 1, 1, 0, 0) |
| 32 | 140 | 1521848 | (14, 6, 4, 2, 1, 1, 0, 0) |
| 32 | 160 | 1850965 | (12, 6, 3, 2, 2, 1, 0, 0) |
| 32 | 180 | 2155200 | (9, 4, 3, 1, 1, 0, 1, 0) |
| 32 | 200 | 2788955 | (12, 5, 3, 2, 1, 0, 1, 0) |
| 64 | 40 | 485376 | (11, 5, 3, 2, 1, 0, 0, 0) |
| 64 | 60 | 10684882 | (8, 3, 1, 1, 1, 1, 0, 0) |
| 64 | 80 | 79438894 | (8, 4, 2, 2, 1, 1, 0, 0) |
| 64 | 100 | 253448394 | (13, 6, 3, 2, 1, 1, 0, 0) |
| 64 | 120 | 552002387 | (10, 4, 3, 2, 2, 1, 0, 0) |
| 64 | 140 | 1046102381 | (8, 4, 2, 1, 1, 0, 1, 0) |
| 64 | 160 | 2519900976 | (9, 4, 3, 2, 1, 0, 1, 0) |
| 64 | 180 | 4020364402 | (14, 6, 4, 2, 1, 0, 1, 0) |
| 64 | 200 | 21818786905 | (10, 5, 2, 1, 1, 1, 1, 0) |

The corresponding collision probabilities are illustrated in table 400 shown in FIG. 4.

Next, a similar analysis for the case of (m, n)-family of hash functions based on generator polynomials with non-zero constant terms is presented.

Theorem 5

For any values of n and m, the family of hash functions based on generator polynomials with non-zero constant terms is ε-opt-secure for $$\varepsilon_2 \leq \frac{R_{2,max}}{2^{n-1}}$$

where $R_{2,max}$ is the maximum number of distinct reducible polynomials of degree n with non-zero constant terms which can be constructed from the irreducible factors of a polynomial of degree m+n.

Proof:

Similar to the proof of Theorem 4.

The maximum value of d for the generator polynomials with non-zero constant terms for the case when q(x) is of type according to Eq. (7) is given by the following Lemma.

Lemma 3

Let q(x) be a polynomial of degree m+n of type (7). Then d is the smallest integer which satisfies the equation $$d \geq \log(m+n+3)-1. \tag{21}$$

Proof:

The value of d should satisfy the equation $$(I_1-1)+2I_2+\ldots+dI_d=m+n, \tag{22}$$

where $I_i$ stands for the number of irreducible polynomials of degree i. Since $$I_n \leq \frac{2^n}{n}, \tag{23}$$

and thus $$(I_1-1)+2I_2+\ldots+dI_d \leq (2^1-1)+2^2+\ldots+2^d, \tag{24}$$

it follows that $$m+n \leq 2^{d+1}-3. \tag{25}$$

Therefore, d is the smallest integer which satisfies the equation $$\log(m+n+3)-1 \leq d. \tag{26}$$

Let $R_2(n, d^{k_d}, \ldots, 2^{k_2}, 1^{k_1})$ be the number of reducible polynomials with non-zero constant terms of degree n, n>0, which can be constructed from irreducible polynomials with non-zero constant terms of degree at most d given that each polynomial of degree d has multiplicity $k_d$. Next, a closed formula for $R_2(n, d^{k_d}, \ldots, 2^{k_2}, 1^{k_1})$ is derived.

Lemma 4

For d=1:

$$R_2(n,1^{k_1})=1, \text{ for } k_1 \geq n$$

$$R_2(n,1^{k_1})=0, \text{ for } k_1 < n, \tag{27}$$

and for d>1:

$$R_2(n, d^{k_d}, \ldots, 2^{k_2}, 1^{k_1}) = \tag{28}$$

$$\sum_{i_{d,1}=0}^{A_{d,1}} \sum_{i_{d,2}=0}^{A_{d,2}} \cdots \sum_{i_{d,I_d}=0}^{A_{d,I_d}} \sum_{i_{d-1,1}=0}^{A_{d-1,1}} \cdots \sum_{i_{3,1}=0}^{A_{3,1}} \sum_{i_{3,2}=0}^{A_{3,2}} \sum_{i_{2,1}=0}^{A_{2,1}} R_2$$

$$\left(n - 2i_{2,1} - 3(i_{3,1} + i_{3,2}) - \ldots - d\sum_{j=1}^{I_d} i_{d,j}, 1^{k_1}\right),$$

where $$A_{d,1} = \min\left(\left\lfloor \frac{n}{d} \right\rfloor, k_d\right) \tag{29}$$

-continued $$A_{d,2} = \min\left(\left\lfloor \frac{n - d \cdot i_{d,1}}{d} \right\rfloor, k_d\right)$$

...

$$A_{d,l_d} = \min\left(\left\lfloor \frac{n - d \sum_{j=1}^{l_d-1} i_{d,j}}{d} \right\rfloor, k_d\right)$$

$$A_{d-1,1} = \min\left(\left\lfloor \frac{n - S(d:d)}{d-1} \right\rfloor, k_{d-1}\right)$$

...

$$A_{3,1} = \min\left(\left\lfloor \frac{n - S(d:4)}{3} \right\rfloor, k_3\right)$$

$$A_{3,2} = \min\left(\left\lfloor \frac{n - S(d:4) - 3i_{3,1}}{3} \right\rfloor, k_3\right)$$

$$A_{2,1} = \min\left(\left\lfloor \frac{n - S(d:3)}{2} \right\rfloor, k_2\right),$$

where $$S(d:i) = \sum_{r=i}^{d}\left(r \cdot \sum_{j=1}^{l_r} i_{r,j}\right).$$

Proof:

Similar to Lemma 2.

By an exhaustive search with the value of d bounded by Lemma 3, the following values for $R_2(n, d^{k_d}, \ldots, 2^{k_2}, 1^{k_1})$ for n=32 and n=64 and message length m≤200 have been computed. The values are illustrated in the following table, where the last column shows the multiplicities $k_1$, k-2, ..., $k_d$ which maximize $R_2(n, d^{k_d}, \ldots, 2^{k_2}, 1^{k_1})$.

| n | m | $R_{2, max}(n, d^{k_d}, \ldots, 1^{k_1})$ | $(k_1, \ldots, k_8)$ |
|---|---|---|---|
| 32 | 20 | 722 | (7, 3, 2, 1, 1, 0, 0, 0) |
| 32 | 40 | 10139 | (10, 4, 2, 1, 1, 0, 0, 0) |
| 32 | 60 | 29542 | (10, 5, 3, 2, 1, 0, 0, 0) |
| 32 | 80 | 98890 | (6, 2, 1, 1, 1, 1, 0, 0) |
| 32 | 100 | 232159 | (10, 4, 3, 1, 1, 1, 0, 0) |
| 32 | 120 | 340789 | (14, 6, 3, 2, 1, 1, 0, 0) |
| 32 | 140 | 411034 | (8, 4, 3, 2, 2, 1, 0, 0) |
| 32 | 160 | 485665 | (12, 6, 3, 3, 2, 1, 0, 0) |
| 32 | 180 | 666619 | (10, 5, 2, 2, 1, 0, 1, 0) |
| 32 | 200 | 775279 | (14, 7, 4, 2, 1, 0, 1, 0) |
| 64 | 40 | 485376 | (11, 5, 3, 2, 1, 0, 0, 0) |
| 64 | 60 | 10684882 | (8, 3, 1, 1, 1, 1, 0, 0) |
| 64 | 80 | 79438894 | (8, 4, 2, 2, 1, 1, 0, 0) |
| 64 | 100 | 46584896 | (14, 6, 3, 3, 1, 1, 0, 0) |
| 64 | 120 | 115748456 | (12, 5, 4, 2, 2, 1, 0, 0) |
| 64 | 140 | 263849829 | (10, 4, 3, 1, 1, 0, 1, 0) |
| 64 | 160 | 578560266 | (14, 6, 3, 2, 1, 0, 1, 0) |
| 64 | 180 | 2632885966 | (6, 2, 2, 1, 1, 1, 1, 0) |
| 64 | 200 | 6126181056 | (10, 4, 2, 2, 1, 1, 1, 0) |

The corresponding collision probabilities are illustrated in table 400 shown in FIG. 4.

The invention claimed is:

1. A method comprising:
pseudo-randomly selecting, based on a first cryptographic key, a generator polynomial p(x) from the set of polynomials of degree n over a Galois Field, wherein the generator polynomial p(x) is a reducible polynomial; and
generating a cryptographic checksum for a message M(x), wherein
generating the cryptographic checksum for message M(x) comprises calculating:

g(f(M(x))mod p(x)), g a first function, and
f is a second function.

2. The method of claim 1, wherein the generator polynomial p(x) comprises a non-zero constant term.

3. The method of claim 1, further comprising pseudo-randomly generating a pad s of length n, wherein the first function g comprises an addition with the pad s.

4. The method of claim 3, wherein the pad s is generated based on a second cryptographic key.

5. The method of claim 3, wherein the pad s is dependent on information which is specific for the message.

6. The method of claim 1, wherein the generator polynomial p(x) is dependent on information which is specific for the message.

7. The method of claim 6, wherein the information which is specific for the message comprises a message sequence number.

8. The method of claim 1, wherein the second function f comprises a multiplication with a fixed polynomial $x^n$.

9. The method of claim 1, further comprising:
appending the generated cryptographic checksum to the message, and
transmitting the message and the appended cryptographic checksum.

10. The method of claim 1 further comprising:
receiving the message and cryptographic checksum appended to the message,
verifying if the generated cryptographic checksum is identical to the cryptographic checksum appended to the message.

11. A computer program product comprising a non-transitory computer readable medium storing a computer program comprising:
instructions for pseudo-randomly selecting, based on a first cryptographic key, a generator polynomial p(x) from the set of polynomials of degree n over a Galois Field, wherein the generator polynomial p(x) is a reducible polynomial; and
instructions for generating a cryptographic checksum for a message M(x), wherein
the instructions for generating the cryptographic checksum for message M(x) comprises instructions for calculating: g(f(M(x))mod p(x)), wherein g is a first function, and f is a second function.

12. An apparatus, the apparatus being configured to:
pseudo-randomly select, based on a first cryptographic key, a generator polynomial p(x) from the set of polynomials of degree n over a Galois Field, wherein the generator polynomial p(x) is a reducible polynomial; and
generate a cryptographic checksum for a message M(x) by performing a process comprising calculating:

g(f(M(x))mod p(x)), wherein g a first function, and
f is a second function.

13. The apparatus of claim 12, wherein the generator polynomial p(x) comprises a non-zero constant term.

14. The apparatus of claim 12, being further configured for pseudo-randomly generating a pad s of length n, wherein the first function g comprises an addition with the pad s.

15. The apparatus of claim 14, being further configured for generating the pad s based on a second cryptographic key.

16. The apparatus of claim 14, wherein the pad s is dependent on information which is specific for the message.

17. The apparatus of claim 12, wherein the generator polynomial p(x) is dependent on information which is specific for the message.

18. The apparatus of claim 17, wherein the information which is specific for the message comprises a message sequence number.

19. The apparatus of claim 12, wherein the second function $f$ comprises a multiplication with a fixed polynomial $x^n$.

20. The apparatus of claim 12, wherein the apparatus is further adapted to: transmit the message together with the generated cryptographic checksum.

21. The apparatus of claim 12, wherein the apparatus is further adapted to: verify if the generated cryptographic checksum is identical to a cryptographic checksum received with the message.

22. The apparatus of claim 12, wherein the apparatus is a mobile terminal.

23. The apparatus of claim 12, wherein the apparatus is radio access node.

* * * * *